United States Patent [19]

Kurtz et al.

[11] 3,819,431

[45] June 25, 1974

[54] METHOD OF MAKING TRANSDUCERS EMPLOYING INTEGRAL PROTECTIVE COATINGS AND SUPPORTS

[75] Inventors: Anthony D. Kurtz, Englewood; Charles L. Gravel, Riveredget; Joseph R. Hallon, Jr., Wood-Ridge, all of N.J.

[73] Assignee: Kulite Semiconductor Products, Inc., Ridgefield, N.J.

[22] Filed: Dec. 7, 1972

[21] Appl. No.: 311,724

Related U.S. Application Data

[62] Division of Ser. No. 186,694, Oct. 5, 1971, Pat. No. 3,753,196.

[52] U.S. Cl. .................................... 156/7, 156/17

[51] Int. Cl. ............................ C23f 1/02, C23b 3/04

[58] Field of Search ........... 156/3, 7, 8, 17; 96/36.2; 338/2, 3

[56] References Cited

UNITED STATES PATENTS

| | | | |
|---|---|---|---|
| 3,315,201 | 4/1967 | Werme | 338/2 |
| 3,575,745 | 4/1971 | Hill | 156/3 |
| 3,662,312 | 5/1972 | Thorp et al. | 338/4 |

*Primary Examiner*—William A. Powell
*Assistant Examiner*—Brian J. Leitten
*Attorney, Agent, or Firm*—Arthur L. Plevy

[57] ABSTRACT

There is disclosed a force transducer fabricated from silicon and having the appearance of an annular disk. Disposed on one surface of said disk are one or more piezoresistive elements which respond to a force applied to a diaphragm portion of said disk which is surrounded by the wall formed by the annular ring. The disk is mounted in a housing with the piezoresistive elements facing away from the applied force surface; this surface of the diaphragm and ring has formed thereon a thin layer of silicon dioxide which serves to protect the disk against deleterious agents present in the force transmitting environment while further serving to eliminate an undesirable bimetallic effect.

4 Claims, 11 Drawing Figures

METHOD OF MAKING TRANSDUCERS EMPLOYING INTEGRAL PROTECTIVE COATINGS AND SUPPORTS

This is a divisional of U.S. Pat. No. 3,753,196 of the same title patented on Aug. 14, 1973 and filed as Ser. No. 186,694 on Oct. 5, 1971.

This invention relates to electromechanical transducers and, more particularly, to such a transducer for converting mechanical displacements into electrical signals, such transducers being of the type employing piezoresistive elements fabricated from silicon.

Presently, the semiconductor transducers, because of their relatively small dimensions, are finding use in a wide number of applications. Semiconductor transducers besides being smaller than conventional mechanical types, possess higher reliability and increased response.

Because of their relatively small size, such transducers have found widespread application in the field of medicine. These transducers may actually be inserted into the blood stream, tissue or otherwise coupled to the body for various measurements. It is, of course, realized that for such stringent applications great care has to be taken in affording reliability to the transducers while fabricating the same as small and as sensitive as possible to permit implantation if desired.

Basically, a piezoresistive type of transducer employs a silicon resistive element which resistance varies according to the intensity or magnitude of an applied force. The force is usually applied to a relatively thin semiconductor diaphragm or membrane to which the element is mounted or diffused upon. The force serves to actually deflect or displace the membrane and hence cause the resistance of the element mounted thereon to vary.

The force being measured is transferred through the force summing membrane to the strain responsive elements causing the element to expand or compress. This produces a change in the resistance of the element. Such elements are conventionally arranged as a Wheatstone Bridge circuit, with one to four of the bridge legs being active.

When using the semiconductor transducer in the medical electronic field or other fields, a great many problems exist.

First, the device must be made small to have a relatively good response to small magnitude forces. This contemplates using a relatively thin diaphragm in order to respond to or deflect with the application thereto of small forces. Such thin diaphragms are difficult to fabricate. This is so for a number of reasons, the main being that in the manufacturing process the diaphragm must be supported for soldering of leads, mounting in a housing and so on. In the support process, they may be easily ruptured or cracked because of the small thickness of the diaphragm.

Secondly, in operation within the environment, many deleterious agents which exist therein, such as salt solutions and so on, react with the silicon and serve to cause chemical changes due to electrolytic action or otherwise which tend to destroy the diaphragm of silicon and hence render the device unusable.

Prior art devices attempt to solve this problem by coating the silicon diaphragm with a grease-like compound or an epoxy. These serve to change the characteristics of the transducer and are also subject to decomposition. Furthermore, if they are not uniformly applied, they can cause non-linearities in transducer response. Other approaches bond or glue protective layers of metal (gold, platinum), rubber and so on to the diaphragm. These approaches are also unreliable and expensive as they involve multiple additional steps in the manufacturing procedure.

It is therefore an object of the present invention to provide an improved semiconductor transducer employing a thin diaphragm and including a thin coating for protecting the semiconductor diaphragm for deleterious agents present in the force transmitting environment.

According to an embodiment of the present invention, a transducer assembly for measuring the intensity of a force applied thereto comprises an annular disk fabricated from silicon and having a central opening defining an active area for deflecting in response to an applied force, a piezoresistive element is located on the surface of said disk furthest removed from said opening and within the active area, a thin layer of silicon dioxide covers all the exposed surfaces of said disk within said central opening, and means for mounting said disk with said layer of silicon dioxide facing the direction of said force whereby said piezoresistive element is separated from the force transmitting environment by said thickness of said disk and said layer of silicon dioxide.

These and other objects of the present invention will become clearer if reference is made to the following specification when read in conjunction with the accompanying figures, in which.

Figure 1:
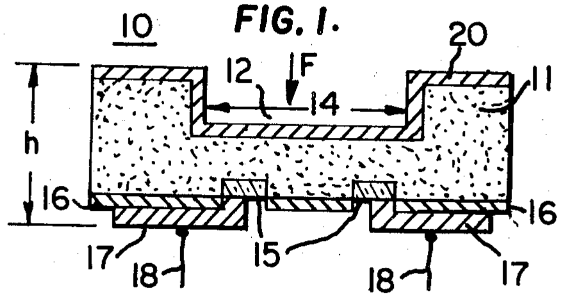
FIG. 1 is a cross-sectional side view of a transducer according to this invention.

Referring to FIG. 1, numeral 10 references a transducer having an integral supporting annular ring 11 fabricated from silicon. The annular structure 11 is essentially an annular disk fabricated from a single crystal or wafer of silicon, as will be explained.

The annular disk or ring 11 has a central aperture 12, the diameter of which defines an active area 14, which deflects or displaces upon application of a force F thereto.

Although not drawn to scale, the total height, $h$, of the unit may conventionally be about 3–6 mils, while the thickness of the diaphragm formed within the active area 14 may be about 0.5 mils although smaller thickness diaphragms may be fabricated.

The configuration shown has one or more piezoresistive elements 15 diffused into the bottom surface of the disk 10. Such piezoresistive elements 15 are formed by conventional diffusion techniques and are essentially diffused silicon resistors isolated by P-N junctions, whose resistance varies according to the magnitude of the applied force F. The force F serves to deflect the diaphragm defined by the active area 14 thus serving to cause elements 15 to compress or expand and thereby causing resistive changes according to the well known piezoresistive effect.

Prior to the diffusion process, a layer 16 of silicon dioxide ($SiO_2$) is formed over the bottom surface of the disk 10. Windows on this layer are then opened by an etching technique to allow the formation of diffused piezoresistive elements by selective solid state diffusion. Metal contact lands 17 are then deposited. Leads 18 are coupled to contacts 17 and a source of voltage is applied via leads 18 in order to bias the devices 15 and therefore obtain current changes according to resistance changes of the devices.

The annular disk 10 is further treated to provide an additional layer 20 of silicon dioxide on the top surface of the disk 10. This layer 20, as will be explained, serves to protect the transducer 10 from deleterious or caustic agents such as saline solutions which may exist in the biomedical force transmitting environment. The layer 20 further serves to increase the overall response of the transducer by substantially eliminating the bimetallic affect which normally would be present.

The structure of FIG. 1 may be fabricated as follows.

Starting with an n-type silicon wafer of desired thickness, one would chemically etch the central aperture 12 of the annular ring 11 by using a combination oxide masking and photoresist technique or a simple photoresist technique. The etching would be done to a depth resulting in a diaphragm of the desired thickness. Oxide layers 20 and 16 are then formed about the wafer and windows are then opened in the oxide layer 16 to allow the formation by selective solid state diffusion of the piezoresistive elements 15. This therefore provides the structure 10 by relatively simple operations. It will be shown subsequently that by using epitaxial growth techniques similar structures can be provided with additional advantages.

Figure 2:
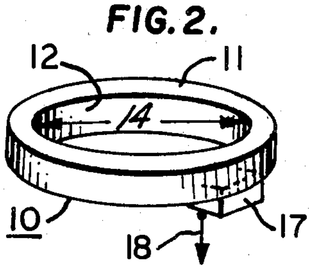
FIG. 2 is a plan view of the transducer of FIG. 1.

FIG. 2 shows a perspective view of transducer 10, showing the annular disk configuration more clearly. Although the disk is shown as circular, it is obvious that other configurations could be employed as well.

Figure 3:
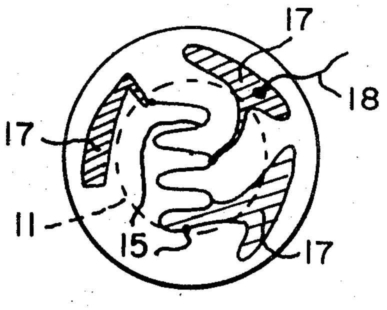
FIG. 3 is a bottom view of the transducer of FIG. 1.

FIG. 3 shows a bottom view of a transducer 10 showing two piezoresistive elements 15 diffused on the bottom surface thereof and within the active area of the disk. Appropriate terminals of the elements 15 are brought out to metallic contacts 17 desirably located underneath the thicker portion of the annular disk 10 or the non-active area, as that area which does not substantially deflect or distort upon application of forces to the transducer.

Before explaining the fabrication of such devices as shown in FIGS. 1 to 3, a brief explanation of the advantages and operation of the device will be given.

Basically, a major disadvantage encountered in using diffusion techniques in producing thin diaphragms for small pressure or force transducers resides in a lack of sensitivity at low pressure or for small forces. This is due to the fact that practically there is a lower limit as to diaphragm thickness limited by fabrication techniques. For example, if one desires to manufacture or produce a diaphragm of silicon which is less than, for example, 0.0005 inches (0.5 mils), it is found that the same is too fragile to handle or to be operated on.

The use of an integral silicon cup or disk to provide added mechanical strength and support, to permit clamping of the diaphragm is well known in the art. However, although the basic approach of producing the integral disk is known, the resultant structures are attendant with problems.

First, it is desired to make the diaphragm or active area of the annular disk as thin as possible (0.0001 to 0.0005 inch) while, for good support, the annular ring should be as thick as possible (0.003 to 0.006 inch).

These relative dimensions introduce a fabrication difficulty. The center portion or section of the structure has to be chemically milled to produce the active area. If the entire height, $h$, of the ring is to be, for example, 0.005 inch or 5 mils, this means that 0.0048 inch of silicon material must be milled away to provide an active area or diaphragm of 0.0002 inch thick. From a comparison of such dimensions, it is seen that it would be difficult to maintain flatness, parallelism and uniformity across the active area. Therefore, it appears that it is necessary to keep the annular ring rather thin as well.

A more serious problem arises due to the bimetallic effect between the silicon dioxide layer 16 of FIG. 1 and the silicon diaphragm or active area of the transducer. During the processing step of diffusing the piezoresistive elements 15 into the diaphragm, a layer of silicon dioxide 16 is thermally grown on the bottom surface of the transducer. It is necessary to leave this layer 16 intact to provide passivation of the diffused junction.

The silicon dioxide layer is grown at a temperature of about 1,150° and since its expansibility is considerably less than silicon ($0.5 \times 10^{-6}/°C$ compared to $2.5 \times 10^{-6}/°C$), a diffused diaphragm is found to be convex at room temperature. This is unacceptable as the convex configuration predistorts the piezoresistive elements and produces non-linear deflections. As the temperature is raised, moreover the disk tends to flatten, thereby affecting overall performance at higher temperature. This effect is noticeable even with diaphragms which are 0.001 inch thick. Since the stiffness of the diaphragm is a function of the reciprocal of a power of its thickness, the effect is very appreciable for thin diaphragms.

The transducer configuration shown in FIGS. 1 to 3 and the techniques of producing the same eliminates these problems.

Before discussing the mounting apparatus and housing assembly (FIG. 4) associated with such transducers, reference is made to FIG. 5 to show an alternate method of fabricating such a transducer.

Figures 5A, 5B, 5C:
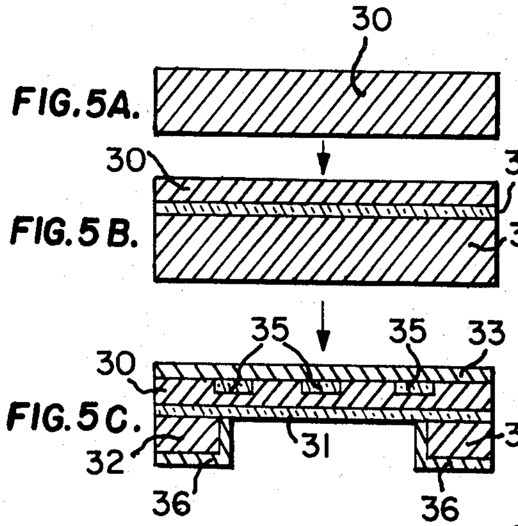
FIGS. 5A–5C are cross-sectional views useful in explaining one fabrication process of such a transducer.

The process begins with a piece of single crystal silicon wafer 30 (FIG. 5A).

The next step is to thermally grow a layer of silicon dioxide 31 (FIG. 5B) and then by epitaxial means a poly-crystalline layer 32 of silicon is deposited.

The n-type wafer 30 is now machined and polished or thinned down to about 0.0002 inch or less, thus representing the thickness of the diaphragm.

A second layer 33 of silicon dioxide is now thermally grown on the polished surface and piezoresistive elements 35 are formed by a conventional diffusion process.

The final step (FIG. 5C) is to chemically mill out the center of the polycrystalline layer 32 to form an annular support ring. This is no longer a critical step, since the layer of silicon dioxide 31 will resist the chemical etchant such as a combination of nitric acid ($HNO_3$) and hydroflouric acid (HF), used to mill out the silicon.

The thickness of the diaphragm 30 as determined by the mechanical lapping and polishing step is an inherently more controllable and accurate process than a chemical milling operation. Therefore, the width of the diaphragm is fixed, accurate and the surfaces are smooth and uniform. Also as seen in FIG. 5C the silicon diaphragm is sandwiched between two layers of silicon dioxide 31 and 33 which therefore serves to eliminate the bimetallic effect, because of the equal forces exerted on the opposite surfaces of the silicon diaphragm 30 during temperature cycling.

Since the sensitivity of the sensor is a function of the reciprocal of the square of the thickness and the natural frequency is a function of the reciprocal of the thickness, a decrease in thickness from 5 mils to 1.5 mils would result in a transducer with 10 times the output while the natural frequency would only be reduced by a factor of three.

It is also noted that the chemical milling process to form the central aperture of the support ring could have been accomplished earlier in the process.

There is also a layer 36 of silicon dioxide formed within the periphery of the annular ring and above the surfaces.

The above-described processes of etching, milling, diffusing and thermal growth are well known in the art and capable of being implemented by one so skilled. However, the implementation of the steps to provide the final transducer are important to the inventive concept.

Referring to FIG. 6, there is shown still another technique of fabrication of such a transducer configuration.

Figures 6A, 6B, 6C, 6D:
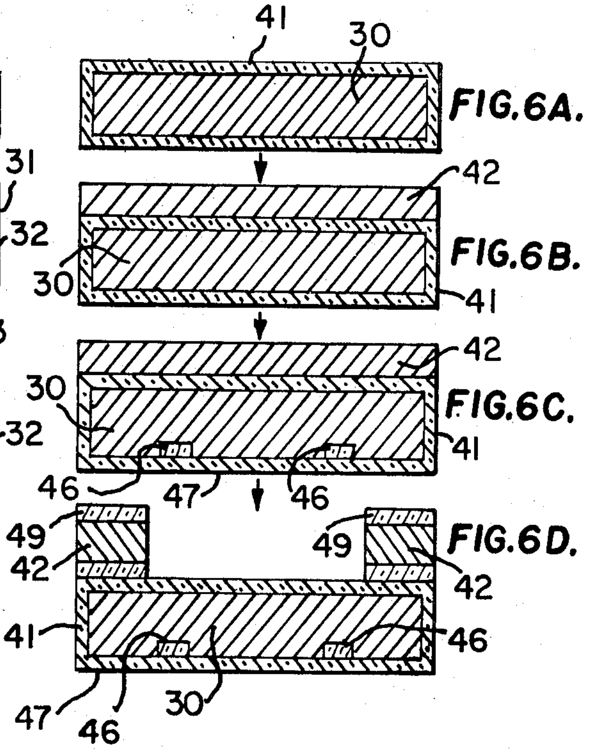
FIGS. 6A–6C are still another series of cross-sectional views showing an alternate method of fabrication.

A wafer of n-type silicon 30 is coated by a thermal growth process with a uniform layer of silicon dioxide 41 to surround the entire wafer (FIG. 6A).

A layer 42 of polycrystalline silicon is epitaxially deposited on one surface of layer 41.

The opposite surface of the composite structure is then machined by a mechanical milling process (FIG. 6C) to obtain the desired thickness of layer 30. After reaching the desired diaphragm thickness, a new layer of silicon dioxide 47 is grown and the piezoresistive elements 46 diffused therein.

The polycrystalline layer 42 is now chemically milled or etched to form the central aperture of the annular ring (FIG. 6D).

FIG. 6D further shows a metal deposition layer 49 which can be deposited directly on the surfaces of the annular ring. This is important, as the silicon dioxide layer 41 serves to isolate the diaphragm and transducer and there is no need to provide isolation by P-N junctions as is done in the prior art.

The metal contacts 17 of FIGS. 1, 2 and 3 can be provided by depositing metal areas on the silicon dioxide layer 33 which contact the diffused resistors at their extremities, or alternately large contact areas can be diffused simultaneously with the piezoresistive elements and metal layers may be subsequently deposited thereon.

The metal contact areas can be defined by a conventional photoresist and chemical etching process.

The metal contacts 17 may be deposited by a vapor deposition technique, chemical plating, electrolytic plating and so on.

The above techniques have been used in the fabrication of MOS integrated circuits and are sometimes referred to as dielectric isolation techniques and were also utilized for the fabrication of bipolar integrated circuits.

The lead wires 18 (FIG. 1) may be attached to the metallic contacts by electronic welding or thermocompression bonding.

Figure 4:
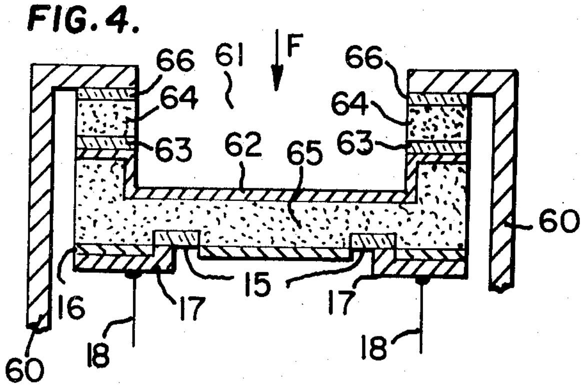
FIG. 4 is a cross-sectional view of a transducer mounted to a suitable housing.

Referring to FIG. 4, there is shown a support housing 60 for the transducer assembly as shown in FIG. 1. The housing 60 may be fabricated from a suitable metal such as brass, steel, nickel, invar and so on, or alternatively some other material with a solderable metal layer on the inner surface thereof.

The housing 60 is generally cylindrical in shape with a top opening 61 about the same size as the active diaphragm area 62.

The top surface periphery of the annular ring portion of the transducer may be soldered by means of a solder glass bond 63, to a silicon, tungsten or other low expansion material block 64. The block 64 may then be glass soldered to the housing as shown in FIG. 4 by the solder bond 66, or alternately a solderable metal layer may be provided on the surface of the block 64 and the resulting structure may be soldered using metallic solder to the housing 60.

This gives a virtual hermetic sealed structure which will not allow the ingress of biological fluids in the force F transmitting atmosphere to enter the housing and attack the transducers or metal contacts. The integral silicon dioxide layer 65 of course protects the diaphragm from saline solutions which would otherwise create chemical reactions, electrolytic or otherwise, with the silicon thus serving to destroy the transducer assembly.

A typical annular diaphragm as shown in FIG. 1, for example, was approximately 1/32 inch in diameter. The total height of the annular ring was about 0.003 inches, while the diaphragm thickness was approximately 0.0005 inches. The silicon dioxide layers could vary between 1,000 Angstrom units to 30,000 Angstrom units and were typically 8,000 Angstrom units thick.

In summation, the structures described herein possess the following advantages.

1. The annular support or ring configuration facilitates fabrication of very thin diaphragms since it affords structural strength to the device during the manufacturing process.

2. The annular support provides an integral clamping surface about the periphery of the diaphragm thereby assuring proper and linear deflection of the diaphragm.

3. The annular support allows the formation of a protective oxide layer on the force responsive surface of the diaphragm thus preventing electrolytic action due to saline solutions present in the force transmitting environment from reacting with the n-type silicon wafer and piezoresistive elements.

4. The thickness of the diaphragm is determined by a mechanical lapping technique which is inherently easier to control for providing uniform and smooth diaphragm surfaces.

The fabrication techniques shown in FIGS. 5 and 6 employ epitaxial growth processes as explained, the advantage being that the layer of silicon dioxide would serve to control the penetration of the etchant when forming the central aperture of the annular ring.

However, it is obvious that one could provide the exact integral silicon structure of FIGS. 1, 2 and 3 by operating upon a single wafer of n-type silicon.

For example, starting with the single wafer of n-type silicon of, for example, a thickness of 5 mils, one would chemically etch the central aperture of the ring by a photoresist technique. This would be done to the desired depth. Next, one would lap, polish or treat the opposite surface for accommodating the piezoresistive elements to the final diaphragm thickness. The silicon dioxide layers as shown in FIG. 1 could be first thermally deposited or done later. The main factor being that the structure can be formed from an integral piece of n-type silicon and because of the silicon dioxide layers eliminate the electrolytic action due to saline solutions and avoid bimetallic effects as well.

We claim:

1. A method of fabricating a pressure transducer from an integral piece of silicon comprising the steps of:

a. thermally growing a thin layer of silicon dioxide on one surface of said piece, b. mechanically milling said other surface to a predetermined thickness, c. epitaxially growing a relatively thick layer of polycrystalline silicon on said thin layer of silicon dioxide, d. diffusing piezoresistive elements on said milled surface, and e. chemically etching a central aperture in said thick layer of polycrystalline silicon to form an annular ring for supporting said structure.

2. The method according to claim 1 wherein said thin layer of silicon dioxide is between 1,000 and 30,000 Angstrom units.

3. The method according to claim 1 wherein said predetermined thickness is between 0.1 to 1 mil.

4. The method according to claim 1 wherein said thick layer of polycrystalline silicon is between 1 to 10 mils.

* * * * *